United States Patent
Sasage et al.

(10) Patent No.: US 6,755,908 B2
(45) Date of Patent: Jun. 29, 2004

(54) ADMIXTURE AND EXTRUDABLE HYDRAULIC COMPOSITION

(75) Inventors: Yoshiaki Sasage, Niigata-ken (JP); Tsutomu Yamakawa, Niigata-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 10/384,692

(22) Filed: Mar. 11, 2003

(65) Prior Publication Data

US 2003/0167976 A1 Sep. 11, 2003

(30) Foreign Application Priority Data

Mar. 11, 2002 (JP) .......................................... 2002-065248

(51) Int. Cl.$^7$ .............................................. C04B 16/02
(52) U.S. Cl. ..................... 106/805; 106/696; 106/708; 106/730; 106/776; 106/780; 106/790
(58) Field of Search ................................. 106/696, 708, 106/730, 776, 780, 790, 805

(56) References Cited

U.S. PATENT DOCUMENTS

| | | | | |
|---|---|---|---|---|
| 4,840,789 A | * | 6/1989 | Orr et al. | 424/66 |
| 4,863,721 A | * | 9/1989 | Beck et al. | 424/47 |
| 5,266,334 A | * | 11/1993 | Phadke et al. | 424/489 |
| 6,197,100 B1 | * | 3/2001 | Melbouci | 106/174.1 |
| 6,306,933 B1 | * | 10/2001 | Eiger et al. | 523/205 |

FOREIGN PATENT DOCUMENTS

| | | | |
|---|---|---|---|
| JP | 61-72669 A | * | 4/1986 |
| JP | 61-72670 A | * | 4/1986 |

OTHER PUBLICATIONS

Derwent Abstract No. 1968–99258P, abstract of Netherlands Patent Application No. 6715142A.*

* cited by examiner

*Primary Examiner*—Anthony J. Green
(74) *Attorney, Agent, or Firm*—Birch, Stewart, Kolasch & Birch, LLP

(57) ABSTRACT

An admixture comprising a nonionic water-soluble cellulose ether having an average particle size of 120–500 $\mu$m is suited for hydraulic compositions. The admixture does not form clumps even in the presence of a large amount of water. The hydraulic composition having a proper amount of the admixture added is effectively extrudable.

16 Claims, No Drawings

ADMIXTURE AND EXTRUDABLE HYDRAULIC COMPOSITION

TECHNICAL FIELD

This invention relates to admixtures for use in extrudable hydraulic compositions, and extrudable hydraulic compositions which are uniform after mixing the components with a large amount of water.

BACKGROUND OF THE INVENTION

In prior art hydraulic compositions adapted to be extruded into siding members or the like, lightweight aggregates such as perlite are used to improve applicability and reduce the weight. The use of lightweight aggregates, however, requires to increase the amount of water to produce an appropriate mixed composition, which in turn, sometimes causes the water-soluble cellulose ether serving as extrusion aids to form clumps in the mixed composition. Then all the amount of cellulose ether added is not effectively utilized. Also, it is sometimes attempted to condition pulp fibers to a water content of several tens of percents prior to use, in order to enhance the dispersion of pulp fibers. When such conditioned pulp fibers are used, the water content therein causes the water-soluble cellulose ether as the admixture to form clumps in the extrudable hydraulic composition. Then all the amount of cellulose ether added is not effectively utilized. In either case, cellulose ether must be added in excess of the necessity.

SUMMARY OF THE INVENTION

An object of the present invention is to provide an admixture for use in extrudable hydraulic compositions, which is well dispersible and utilized to its entirety in hydraulic compositions even in the presence of a large amount of water; and an extrudable hydraulic composition comprising the admixture.

The inventor has found that a nonionic water-soluble cellulose ether having an average particle size of at least 120 $\mu$m is well dispersible in hydraulic compositions even in the presence of a large amount of water so that the entire amount of the cellulose ether added is utilized to exert its function.

Accordingly, the invention provides an admixture for extrudable hydraulic compositions, comprising a nonionic water-soluble cellulose ether having an average particle size of at least 120 $\mu$m; and an extrudable hydraulic composition comprising the admixture.

DETAILED DESCRIPTION OF THE INVENTION

The admixture of the invention for extrudable hydraulic compositions is defined as comprising a nonionic water-soluble cellulose ether having an average particle size of at least 120 $\mu$m. The average particle size of nonionic water-soluble cellulose ether should be at least 120 $\mu$m, preferably at least 150 $\mu$m, and more preferably at least 180 $\mu$m. With an average particle size of less than 120 $\mu$m, nonionic water-soluble cellulose ether becomes fast dissolvable so that clumps are formed to reduce the amount of nonionic water-soluble cellulose ether that effectively serves for its function. As a result, the amount of cellulose ether added must be increased. The upper limit of average particle size is usually up to 500 $\mu$m, and especially up to 300 $\mu$m. The water-soluble cellulose ether having a particle size in the above range is available by grinding the raw material, sifting and collecting a fraction under appropriate classification conditions.

The nonionic water-soluble cellulose ethers which can be used herein include alkyl celluloses, hydroxyalkyl celluloses, and hydroxyalkyl alkyl celluloses. Illustrative examples include, but are not limited to, methyl cellulose, ethyl cellulose, hydroxyethyl cellulose, hydroxypropyl cellulose, hydroxyethyl methyl cellulose, hydroxyethyl ethyl cellulose and hydroxypropyl methyl cellulose.

Preferably, the nonionic water-soluble cellulose ether has an (aerated) bulk density of 0.2 to 0.65 g/cm$^3$.

Further, the nonionic water-soluble cellulose ether has a viscosity of 1,000 to 50,000 mPa·s, preferably 1,500 to 50,000 mPa·s, more preferably 3,000 to 50,000 mPa·s, as measured in a 1 wt % aqueous solution at 20° C. by a Brookfield viscometer at 12 rpm.

On use, the admixture of the invention comprising the nonionic water-soluble cellulose ether, especially consisting of the nonionic water-soluble cellulose ether alone or as a mixture of two or more is added to an extrudable hydraulic composition. The amount of the admixture added (the total amount of nonionic water-soluble cellulose ethers) is an amount necessary to permit the hydraulic composition to be extruded, usually 0.1 to 2.0% by weight based on the entire components of the extrudable hydraulic composition excluding water, preferably 0.2 to 2.0% by weight and more preferably 0.2 to 1.5% by weight.

If necessary, another water-soluble polymer may be used along with the admixture of the invention for extrudable hydraulic compositions. Examples of other water-soluble polymers include partially saponified polyvinyl alcohol, modified starch, polyethylene oxide, wellan gum, and polyacrylamide.

The extrudable hydraulic composition of the invention contains the admixture defined above as well as conventional components such as hydraulic substances, aggregates, lightweight aggregates, and reinforcing fibers.

The hydraulic substances that harden in the presence of water include cement and gypsum. Cements include ordinary Portland cement, early-strength cement, blast furnace slag cement, fly-ash cement and alumina cement. Gypsum-based hydraulic substances include primarily the dehydrate, hemihydrate and anhydride forms of gypsum. The content of cement or gypsum-based hydraulic substances is not critical and may be set as needed to achieve the required strength.

Powdered silica and fly ash are typical aggregates. Besides, lightweight aggregates are used when weight reduction is desired, and include perlite, hollow microspheres, and styrene beads. Whether the aggregate is ordinary or lightweight, it is combined with the hydraulic substance so that the desired properties are achievable. The hydraulic substance and the aggregate are used in a weight ratio of from 10:90 to 100:0.

Reinforcing fibers are also useful in the hydraulic compositions. At present, pulp fibers that eliminate a concern about carcinogenicity become a substitute for asbestos and are widely used. In the practice of the invention, pulp fibers are advantageously used. Pulp fibers include fibers of virgin pulp, recycled paper pulp, and pulps originating from conifer and broadleaf woods, having an average length of about 200 to 2,000 $\mu$m. Polypropylene, vinylon and acrylic fibers are also useful. From the fire resistance and other standpoints, fibers are preferably used in amounts of 1 to 10 parts by weight provided that the total of the entire components of the hydraulic composition excluding water is 100 parts by weight.

If necessary, setting accelerators and retarders, and surface active agents such as water-reducing agents and dispersing agents are used. These agents are effective for managing the physical properties of a fresh hydraulic composition immediately after mixing of components with water. Any agent meeting a particular purpose may be added in a conventional amount.

To the hydraulic composition of the invention, water is added. The amount of water is conventional though it is determined in accordance with the type of hydraulic composition or the like. Water is preferably used in amounts of 20 to 80 parts by weight provided that the total of the entire components of the hydraulic composition excluding water is 100 parts by weight.

The hydraulic composition of the invention is obtainable by mixing the aforementioned components in a conventional manner. The hydraulic composition thus obtained is formed and hardened into a hardened body by an extrusion molding or suitable method.

EXAMPLES

Examples of the invention and comparative examples are provided to illustrate the invention, and are not intended to limit the scope thereof.

Examples 1–3 and Comparative Examples 1–2

Extrudable cement-based compositions formulated as shown in Tables 2 and 3 below were prepared from the following materials.

(1) Cement: ordinary Portland cement
(2) Silica: sifted powdered silica
(3) Pulp: virgin pulp having an average fiber length of 0.8 mm, conditioned to a water content 20 wt %
(4) Perlite: average particle size 0.8 mm
(5) Water-soluble cellulose ether: Five samples of hydroxypropyl methyl cellulose having different average particle size were obtained by grinding the cellulose raw material under different conditions. The average particle size was determined by the JIS prescribed sieve method using a sieve and a rotating and tapping shaker. The samples are shown in Table 1.

The viscosity of hydroxypropyl methyl cellulose was such that a 1 wt % aqueous solution thereof had a viscosity of 13,000 mPa·s at 20° C. as measured by a Brookfield viscometer at 12 rpm.

The above materials other than water were mixed for 3 minutes in a Henschel mixer, and the prescribed amount of water was added. Immediately thereafter, the mixture was worked 4 minutes in a 10-liter kneader-extruder, then extruded in vacuum. The die used had a profile of 6×75 mm. The extruded samples were examined for extrudability and surface smoothness, with the results shown in Tables 2 and 3.

The evaluation criteria of these tests are shown below.

(1) Extrudability: visually observed
 ○: no meander nor breakage
 x: meander or breakage
(2) Surface smoothness: visual observation and hand feel
 ○: no apparent asperities, not rough to the feel
 Δ: few apparent asperities, but rough to the feel
 x: apparent asperities

TABLE 1

Average particle size of water-soluble cellulose ether

| Sample No. 1 | Average particle size ($\mu$m) |
|---|---|
| 1 | 75 |
| 2 | 108 |
| 3 | 125 |
| 4 | 155 |
| 5 | 210 |

TABLE 2

| | Example 1 | Example 2 | Example 3 |
|---|---|---|---|
| Materials (pbw) | | | |
| Cement | 45 | 45 | 45 |
| Silica powder | 30 | 30 | 30 |
| Pulp | 5 | 5 | 5 |
| Perlite | 20 | 20 | 20 |
| Cellulose ether | No. 3 | No. 4 | No. 5 |
| Cellulose ether amount | 1.3 | 1.3 | 1.3 |
| Water | 50 | 50 | 50 |
| Results | | | |
| Extrudability | ○ | ○ | ○ |
| Surface smoothness | ○ | ○ | ○ |

TABLE 3

| | Comparative Example 1 | Comparative Example 2 |
|---|---|---|
| Materials (pbw) | | |
| Cement | 45 | 45 |
| Silica powder | 30 | 30 |
| Pulp | 5 | 5 |
| Perlite | 20 | 20 |
| Cellulose ether | No. 1 | No. 2 |
| Cellulose ether amount | 1.3 | 1.3 |
| Water | 50 | 50 |
| Results | | |
| Extrudability | X (broken) | X (broken) |
| Surface smoothness | — | — |

As is evident from Tables 2 and 3, the compositions of Examples after mixing for a predetermined time are effectively extruded into parts having good surface smoothness. In contrast, in Comparative Examples, the nonionic water-soluble cellulose ether formed clumps during the mixing duration, resulting in meander or breakage upon extrusion.

There has been described an admixture which is suited for use in extrudable hydraulic compositions, because the nonionic water-soluble cellulose ether does not form clumps even in the presence of a large amount of water. When the admixture is added in a proper amount, the resulting hydraulic composition is effectively extrudable.

Japanese Patent Application No. 2002-065248 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. An extrudable hydraulic composition comprising a hydraulic substance, a nonionic water-soluble cellulose ether having an average particle size of at least 120 μm, and a reinforcing fiber.

2. The composition of claim 1, wherein the cellulose ether is an alkyl cellulose, hydroxyalkyl cellulose or hydroxyalkyl alkyl cellulose.

3. The composition of claim 1, wherein the reinforcing fiber is a pulp fiber, polypropylene fiber, vinylon fiber or acrylic fiber.

4. An extrudable hydraulic composition comprising a hydraulic substance and an aggregate in a weight ratio of from 10:90 to 100:0, a pulp fiber having an average length of about 200 to 2,000 μm in an amount of 1 to 10 parts by weight provided that the total of the entire components of the hydraulic composition excluding water is 100 parts by weight, and a nonionic water-soluble cellulose ether having an average particle size of at least 120 μm in an amount of 0.1 to 2.0% by weight based on the entire components of the extrudable composition excluding water.

5. The composition according to claim 1, wherein the nonionic water-soluble cellulose ether has an average particle size of 180–500 μm.

6. The composition according to claim 4, wherein the nonionic water-soluble cellulose ether has an average particle size of at least 180 μm in an amount of 0.1 to 2.0% by weight based on the entire components of the extrudable composition excluding water.

7. The composition according to claim 1, wherein the nonionic water-soluble cellulose ether has an aerated bulk density of 0.2 to 0.65 g/cm$_3$.

8. The composition according to claim 4, wherein the nonionic water-soluble cellulose ether has an aerated bulk density of 0.2 to 0.65 g/cm$_3$.

9. The composition according to claim 5, wherein the nonionic water-soluble cellulose ether is in an amount of 0.1 to 2.01 by weight based on the entire components of the extrudable hydraulic composition excluding water.

10. The composition according to claim 4, wherein the nonionic water-soluble cellulose ether is in an amount of 0.2 to 1.5% by weight based on the entire components of the extrudable hydraulic composition excluding water.

11. The composition according to claim 9, further comprising at least one water-soluble polymer selected from the group consisting of partially saponified polyvinyl alcohol, modified starch, polyethylene oxide, wellan gum, and polyacrylamide.

12. The composition according to claim 4, further comprising at least one water-soluble polymer selected from the group consisting of partially saponified polyvinyl alcohol, modified starch, polyethylene oxide, wellan gum, and polyacrylamide.

13. The composition according to claim 1, wherein the hydraulic substance is at least one selected from the group consisting of Portland cement, early-strength cement, blast furnace slag cement, fly-ash cement, alumina cement, gypsum dihydrate, gypsum hemihydrate and an anhydride of gypsum.

14. The composition according to claim 4, wherein the hydraulic substance is at least one selected from the group consisting of Portland cement, early-strength cement, blast furnace slag cement, fly-ash cement, alumina cement, gypsum dihydrate, gypsum hemihydrate and an anhydride of gypsum.

15. The composition according to claim 3, wherein the reinforcing fiber is in an amount of 1 to 10 parts by weight based on 100 parts of the entire components of the hydraulic composition excluding water.

16. The composition according to claim 15, wherein the reinforcing fiber is a pulp fiber having an average length of about 200 to 2,000 μm.

* * * * *